(12) United States Patent
Cruz (10) Patent No.: US 11,214,422 B2
(45) Date of Patent: Jan. 4, 2022

(54) EASY-OPEN FLOW-WRAP PACKAGE

(71) Applicant: BEMIS COMPANY, INC., Neenah, WI (US)

(72) Inventor: Tara K. Cruz, Appleton, WI (US)

(73) Assignee: Amcor Flexibles North America, Inc., Neenah, WI (US)

( * ) Notice: Subject to any disclaimer, the term of this patent is extended or adjusted under 35 U.S.C. 154(b) by 727 days.

(21) Appl. No.: 15/503,232

(22) PCT Filed: Aug. 13, 2014

(86) PCT No.: PCT/US2014/050863
§ 371 (c)(1),
(2) Date: Feb. 10, 2017

(87) PCT Pub. No.: WO2016/024964
PCT Pub. Date: Feb. 18, 2016

(65) Prior Publication Data
US 2017/0259979 A1    Sep. 14, 2017

(51) Int. Cl.
*B65D 75/58* (2006.01)
*B65D 65/40* (2006.01)
(Continued)

(52) U.S. Cl.
CPC ........... *B65D 75/5855* (2013.01); *B32B 3/02* (2013.01); *B32B 3/04* (2013.01); *B32B 3/06* (2013.01); *B32B 7/06* (2013.01); *B32B 7/12* (2013.01); *B32B 27/08* (2013.01); *B32B 27/306* (2013.01); *B32B 27/308* (2013.01); *B32B 27/32* (2013.01); *B32B 27/34* (2013.01); *B32B 27/36* (2013.01); *B32B 29/002* (2013.01); *B65D 65/40* (2013.01);
(Continued)

(58) Field of Classification Search
CPC ..................... B65D 75/5855; B65D 77/2032; B65D 33/16; B65D 33/18; B65D 33/20; B65D 33/22; B65D 75/26; B65D 65/40; B32B 7/06; B32B 7/12; B32B 3/04; B32B 27/08; B32B 27/32; B32B 2307/31; B32B 2439/40
USPC ............................. 383/210, 210.1, 211, 107
See application file for complete search history.

(56) References Cited

U.S. PATENT DOCUMENTS 3,655,503 A    4/1972    Stanley et al.
4,058,632 A    11/1977    Evans et al.
(Continued)

FOREIGN PATENT DOCUMENTS

CA    2036324 A1    9/1991
EP    2143557 A1    1/2010
(Continued)

*Primary Examiner* — Jes F Pascua
*Assistant Examiner* — Nina K Attel (57) ABSTRACT

The present invention is directed to a peel-open, non-reclosable package formed from a single thermoplastic laminate comprising a first film laminated to a second film by a lamination film or lamination layer. The package includes a peelable heat-seal seam adhering an interior surface of a first sealing section of the interior package surface to an interior surface of a second sealing section of the interior package surface. The package also includes an asymmetric cross-sectional seal interface formed at the peelable heat-seal seam by disjoining a segment of the first film from the first sealing section prior to heat sealing the first and second sealing sections together.

23 Claims, 11 Drawing Sheets

(51) Int. Cl.
  *B32B 7/06* (2019.01)
  *B32B 7/12* (2006.01)
  *B32B 27/08* (2006.01)
  *B32B 27/32* (2006.01)
  *B32B 3/06* (2006.01)
  *B32B 27/30* (2006.01)
  *B32B 3/02* (2006.01)
  *B32B 3/04* (2006.01)
  *B32B 27/34* (2006.01)
  *B32B 27/36* (2006.01)
  *B32B 29/00* (2006.01)

(52) U.S. Cl.
  CPC ...... *B65D 75/5805* (2013.01); *B32B 2250/24* (2013.01); *B32B 2270/00* (2013.01); *B32B 2307/31* (2013.01); *B32B 2439/00* (2013.01); *B32B 2439/40* (2013.01); *B65D 2575/586* (2013.01)

(56) References Cited

U.S. PATENT DOCUMENTS

| | | | |
|---|---|---|---|
| 4,189,519 A | 2/1980 | Ticknor | |
| 4,252,846 A | 2/1981 | Romesberg et al. | |
| 4,550,141 A | 10/1985 | Hoh | |
| 4,589,145 A * | 5/1986 | Van Erden | B65B 9/067 383/204 |
| 4,615,326 A | 10/1986 | Hsu et al. | |
| 4,615,926 A * | 10/1986 | Hsu | B32B 27/08 428/35.2 |
| 4,666,778 A | 5/1987 | Hwo | |
| 4,784,885 A | 11/1988 | Carespodi | |
| 4,837,088 A | 6/1989 | Freedman | |
| 4,875,587 A | 10/1989 | Lulham et al. | |
| 4,881,649 A | 11/1989 | Hsu et al. | |
| 4,916,190 A | 4/1990 | Hwo | |
| 4,937,139 A | 6/1990 | Genske et al. | |
| 4,944,409 A | 7/1990 | Busche et al. | |
| 5,023,121 A | 6/1991 | Pockat et al. | |
| 5,128,414 A | 7/1992 | Hwo | |
| 5,547,752 A | 8/1996 | Yanidis | |
| 5,945,145 A | 8/1999 | Narsutis et al. | |
| 5,997,968 A | 12/1999 | Dries et al. | |
| RE37,171 E * | 5/2001 | Busche | B65D 77/2044 206/484 |
| 6,777,050 B1 | 8/2004 | Engelaere | |
| 7,416,768 B2 | 8/2008 | Knoerzer et al. | |
| 7,422,782 B2 | 9/2008 | Haedt et al. | |
| 7,504,142 B2 | 3/2009 | Harvey | |
| 7,862,869 B2 | 1/2011 | Papenfuss et al. | |
| 8,398,306 B2 | 3/2013 | Kinigakis et al. | |
| 8,507,084 B2 | 8/2013 | Deng | |
| 8,541,081 B1 | 9/2013 | Ranganathan et al. | |
| 8,551,588 B2 | 10/2013 | Daffner et al. | |
| 8,617,677 B2 | 12/2013 | Trouilhet et al. | |
| 8,679,604 B2 | 3/2014 | Berbert | |
| 8,734,922 B2 | 5/2014 | Bellini et al. | |
| 2010/0247003 A1 * | 9/2010 | Hutter | B65D 33/20 383/207 |
| 2011/0127319 A1 | 6/2011 | Golden | |
| 2012/0158437 A1 | 6/2012 | Willey | |
| 2012/0168340 A1 | 7/2012 | Liang et al. | |
| 2013/0121623 A1 | 5/2013 | Lyzenga et al. | |
| 2013/0266243 A1 | 10/2013 | Kinigakis et al. | |
| 2013/0272631 A1 * | 10/2013 | Kinigakis | B29C 65/76 383/210 |
| 2014/0079343 A1 | 3/2014 | Lyzenga et al. | |

FOREIGN PATENT DOCUMENTS

| | | |
|---|---|---|
| WO | 2004101387 A1 | 11/2004 |
| WO | 2011106486 A1 | 9/2011 |
| WO | 2013114091 A1 | 8/2013 |

* cited by examiner

EASY-OPEN FLOW-WRAP PACKAGE

BACKGROUND OF THE INVENTION

The present invention relates generally to primary packaging and more particularly, to easy-open flow-wrap packages formed from flexible packaging film which includes a peelable heat-seal seam so that they may more readily be torn open through the seam.

Flow-wrap type packages are often used for shipping and storage of a variety of food products and non-food products. Flow-wrap packages are typically formed from a continuous polymeric film or web to envelop a product during assembly or formation of the package. The continuous film is formed into a tube through a folding box and after the forming of this tube, a set of rotating sealing wheels makes a longitudinal seal called a fin seal by application of sufficient heat and pressure to the film to cause the two bonding surfaces of the film to heat seal or fuse together. Methods and equipment for forming heat seals are well known to those skilled in the art. A fin seal is an "inner-face to inner-face" abutment or seam where a first section of the interior surface of the package is heat sealed to a second section of the interior surface of the package, in opposition to an overlap or lap seal, which is an "inner-face to outer-face" abutment where an interior surface of the package is heat sealed to the exterior surface of the package. Conventional fin seals have a symmetric heat-seal interface where the film structure sealed to one side of the interface is a mirror-image of the film structure sealed to the other side of the interface. A longitudinal fin seal usually extends along a rear face of the package. Once the product is placed into the tube, the cross-seals (or end seals) in the form of a fin seal are formed through the cross-sealing jaws. In most applications, the end fin seal of the package is formed together with the beginning seal of the following package. During the sealing operation, the film is cut to split the adjacent package and the cutting knife is generally built into the sealing jaws. Flow-wrap type packages can be used in vertical form-fill-seal and horizontal form-fill-seal packaging applications.

Conventional flow-wrap packages are opened by tearing an end fin seal or cross-seal. This tearing is generally not guided and does not cross-aver the longitudinal fin seal of the package. Consequently, the tearing is stopped by the longitudinal fin seal and further tearing often results in a random breaking of the package.

Peelable polymeric packaging films are well known in the art. These films have been described for example in U.S. Pat. No. 4,944,409 (Busche et al.); U.S. Pat. No. 4,875,587 (Lulham et al.); U.S. Pat. No. 3,655,503 (Stanley et al.); U.S. Pat. No. 4,058,632 (Evans et al.); U.S. Pat. No. 4,252,846 (Romesberg et al.); U.S. Pat. No. 4,615,926 (Hsu et al.); U.S. Pat. No. 4,666,778 (Hwo); U.S. Pat. No. 4,784,885 (Carespodi); U.S. Pat. No. 4,882,229 (Hwo); U.S. Pat. No. 6,476,137 (longo); U.S. Pat. No. 5,997,968 (Dries et al.); U.S. Pat. No. 4,189,519 (Ticknor); U.S. Pat. No. 5,547,752 (Yanidis); U.S. Pat. No. 5,128,414 (Hwo); U.S. Pat. No. 5,023,121 (Pockat et al.); U.S. Pat. No. 4,937,139 (Genske et al.); U.S. Pat. No. 4,916,190 (Hwo) and U.S. Pat. No. 4,550,141 (Hoh), the disclosures of which are incorporated herein in their entirety by reference. They have been constructed with one or more frangible layers which are designed so that they fail within their respective structures when a peeling force is applied. Such failure being by delamination of a multilayer polymeric film or by rupture within the thickness of one or more layers of the polymeric film. By mixing of two immiscible thermoplastic resins, the adhesive and/or cohesive strength of a frangible layer can be altered to affect its peel strength. However, packages made from such films often will not seal properly when wrinkles and/or the package contents are present in the seal area, and produce undesirable "leakers" where the package contents leak through the seal areas. Relatively thick sealant layers composed of a thermoplastic having a melt index above 10 g/10 min are known to seal through wrinkles and/or contamination within seal area by those skilled in the art. However, attempts to form frangible layers by combining these materials with an immiscible thermoplastic, fail to eliminate the leaker problem.

Therefore, there is a definite need to provide flow-wrap packages having a peelable heat-seal seam which can seal through wrinkles and/or contamination in the seal areas.

SUMMARY OF THE INVENTION

The present invention is directed to a peel-open non-reclosable package formed from a single thermoplastic laminate comprising a first film laminated to a second film by a lamination film or lamination layer. The laminate has a first side, an opposing second side, a top surface and a bottom surface and comprises a first sealing section having an interior surface, and a second sealing section having an interior surface. The package includes a first side edge, an opposing second side edge, a third side edge, and an opposing fourth side edge.

One important aspect of the present invention is that the package includes a peelable heat-seal seam adhering an interior surface of a first sealing section of the package to an interior surface of a second sealing section of the package.

Another important aspect of the present invention is that there is an asymmetric cross-sectional seal interface formed within the peelable heat-seal seam by disjoining a segment of the first film from the first sealing section prior to heat sealing the first and second sealing sections together.

In one preferred embodiment, the package is formed from two webs of a single thermoplastic laminate and comprises a first fin seal positioned proximal to the first side edge wherein the peelable heat-seal seam is formed within the first fin seal. The peelable heat-seal seam includes an asymmetric cross-sectional seal interface. In this embodiment, the package also includes a second fin seal positioned proximal to the opposing second side edge, a third fin seal positioned proximal to the third side edge, and a fourth fin seal positioned proximal to the opposing fourth side edge. It is also contemplated that the peelable heat-seal seam may not be formed within the first fin seal. In an alternative embodiment, the peelable heat-seal seam having an asymmetric cross-sectional seal interface is offset from the first fin seal and positioned adjacent to the first fin seal. In order to facilitate the opening of this embodiment of the present invention, there may optionally be included either a score line cut into the laminate or a tear strip both of which are positioned between the peelable heat-seal seam and the first fin seal.

In another preferred embodiment, the package of the present invention may be formed by folding a single thermoplastic laminate upon itself thereby defining a first fold located at the second side edge of the package. The package also includes a first fin seal positioned proximal to the first side edge, a second fin seal positioned proximal to the third side edge and a third fin seal positioned proximal to the opposing fourth side edge. In this embodiment, the peelable heat-seal seam is formed within the first fin seal and includes an asymmetric cross-sectional seal interface.

In another preferred embodiment, the package of the present invention may be formed by folding a single thermoplastic laminate upon itself thereby defining a first fold located at the first side edge rather than at the second side edge of the package. The package of this embodiment includes a first fin seal positioned proximal the second side edge and opposite to the first fold. This embodiment also includes a second fin seal positioned proximal to the third side edge, and a third fin seal positioned proximal to the opposing fourth side edge. In this embodiment, the peelable heat-seal seam is not formed within the first fin seal, but is offset from the first fold. The peelable heat-seal seam includes an asymmetric cross-sectional seal interface. This embodiment may optionally further comprise either a score line cut into the laminate or tear strip each of which is being positioned between the peelable heat-seal seam and the first fold to facilitate the opening of the package.

In yet another preferred embodiment, the package may be formed by folding a single thermoplastic laminate upon itself thereby defining a first fold located at the first side edge and a second fold located at the second side edge. The package of this embodiment includes a first fin seal positioned between the first and second folds, and a peelable heat-seal seam formed within the first fin seal. The package also includes a second fin seal positioned proximal to the third side edge, and a third fin seal positioned proximal to the opposing fourth side edge. The peelable heat-seal seam includes an asymmetric cross-sectional seal interface.

In still yet another preferred embodiment, the package may be formed by folding a single thermoplastic laminate upon itself thereby defining a first fold located at the first side edge and a second fold located at the second side edge. The package of this embodiment includes a first fin seal positioned between the first and second folds, a second fin seal positioned proximal to the third side edge, and a third fin seal positioned proximal to the opposing fourth side edge. This embodiment includes a peelable heat-seal seam which is not formed with a fin seal, but is offset from the first fold. The peelable heat-seal seam includes an asymmetric cross-sectional seal interface. This embodiment may optionally further comprise a score line cut into the laminate or tear strip both of which being positioned between the peelable heat-seal seam and the first fold to facilitate the opening of the package.

In accordance with an important aspect of the present invention, the packages are peelable and non-reclosable. In one embodiment, the lamination film or lamination layer comprises a blend of immiscible thermoplastic resins.

BRIEF DESCRIPTION OF THE DRAWINGS

Further features and advantages of the present invention will become apparent from the following detailed description, taken in combination with the appended drawings, in which.

DETAILED DESCRIPTION OF THE INVENTION

Figure 1:
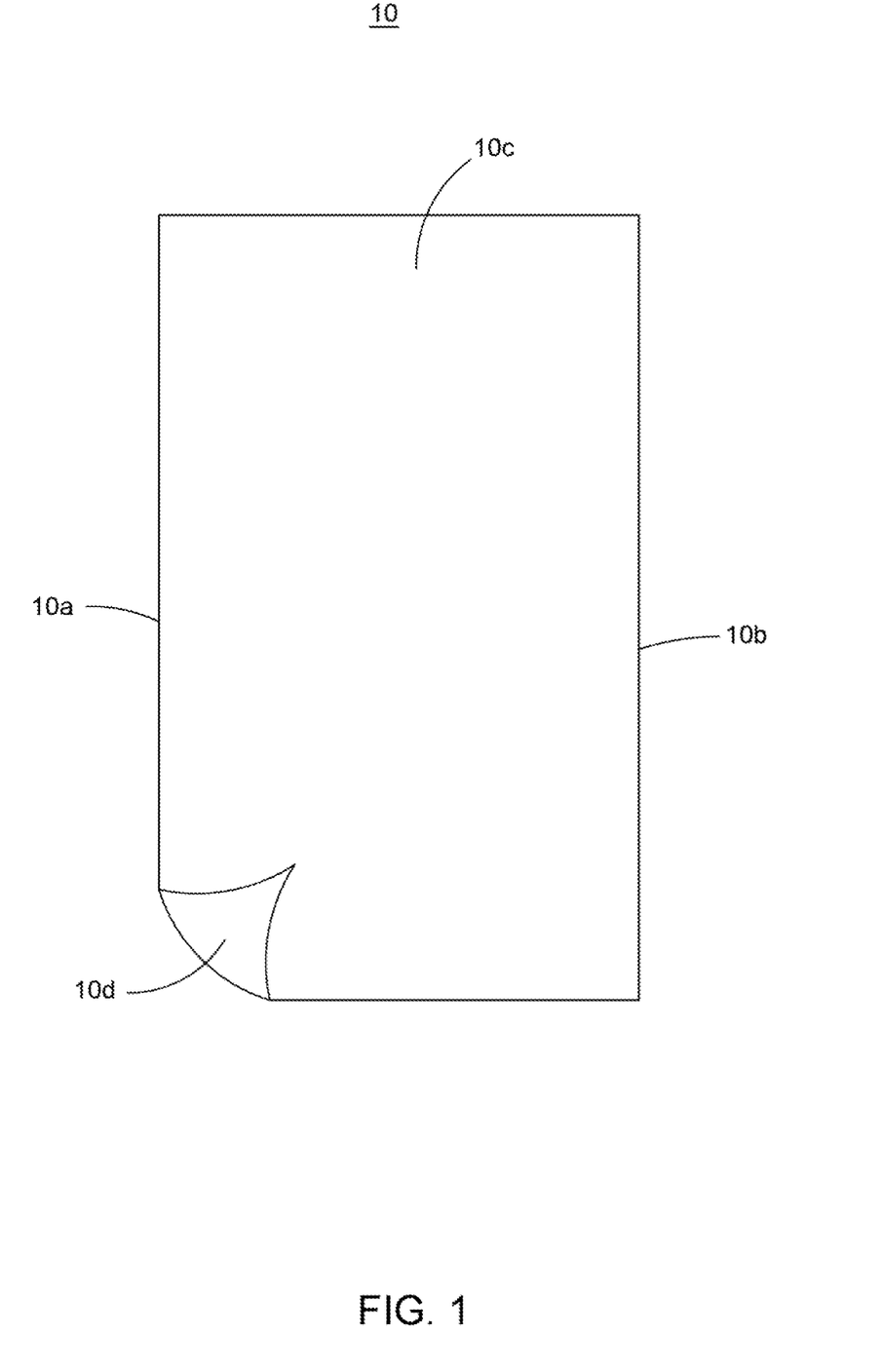
FIG. 1 illustrates a schematic view of one embodiment of laminate used to form the packages according to the present invention.

A preferred embodiment of the peel-open non-reclosable package of the present invention is made from a single thermoplastic laminate 10 which includes a first laminate side 10a, an opposing second laminate side 10b, a top surface 10c and a bottom surface 10d as depicted in FIG. 1. First laminate side 10a and second laminate side 10b are preferably parallel to each other when laminate 10 is in a flat planar state. As depicted, a corner of laminate 10 is turned upward to reveal bottom surface 10d. In one preferred embodiment, laminate 10 comprises a first film 1100 and a second film 1200 wherein both films are the same. In another preferred embodiment, laminate 10 comprises a first film 1100 and a second film 1200 wherein the first film is different than the second film. In another preferred embodiment, laminate 10 comprises a coextruded multilayer non-oriented first film 1100 and a second film 1200 having at least one oriented layer or layer of paper. In yet another preferred embodiment, laminate 10 comprises a lamination film 1300 adhering a first film 1100 to a second film 1200.

Figure 2A:
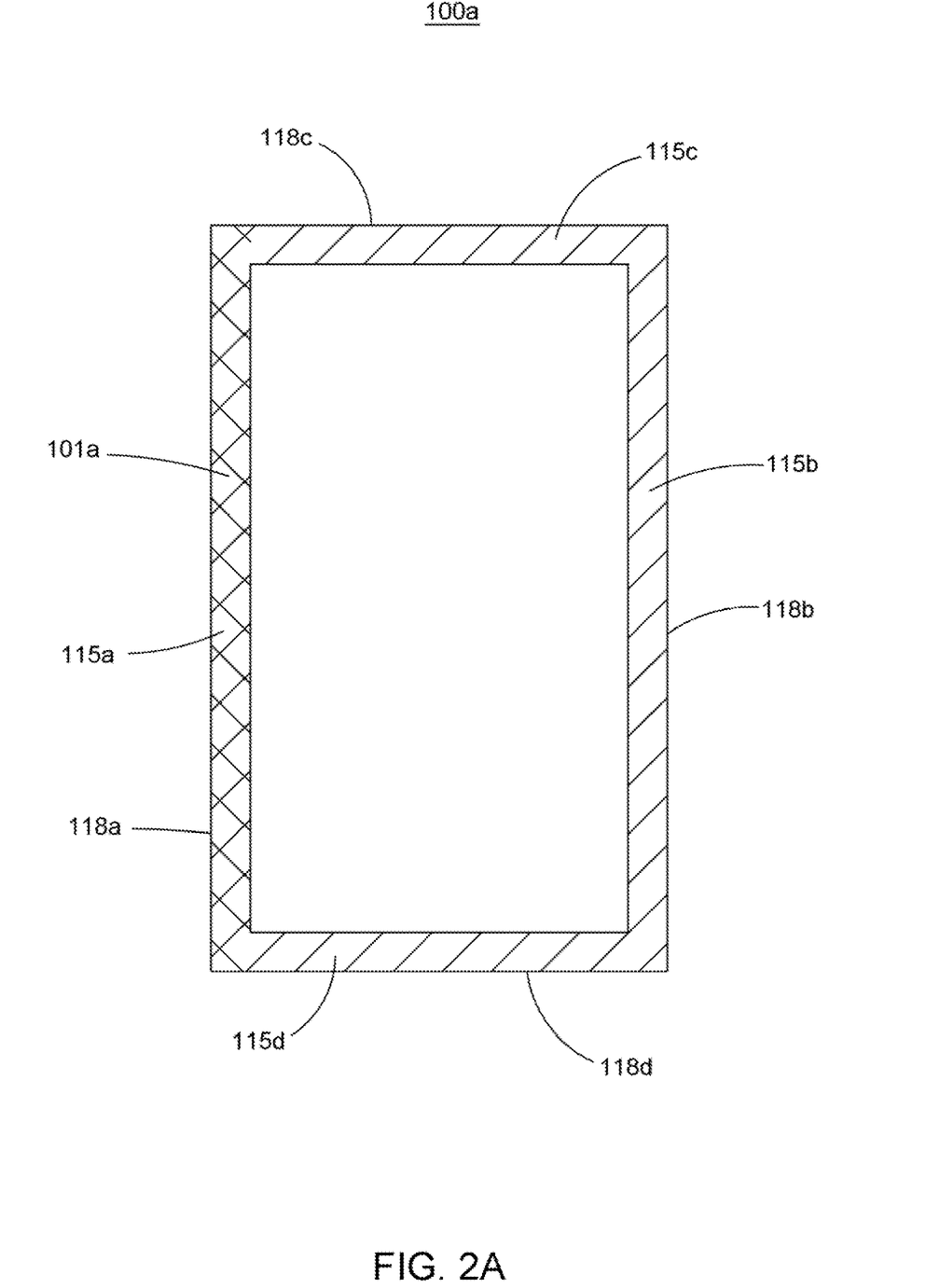
FIG. 2A illustrates a schematic view of one embodiment of a package according to the present invention.

Referring now to FIG. 2A, a preferred embodiment of the present invention is depicted generally as package 100a made from laminate 10 of FIG. 1. Package 100a is formed by heat sealing two webs of laminate 10 together thereby defining package edges as follows: a first side edge 118a, an opposing second side edge 118b, a third side edge 118c, and an opposing fourth side edge 118d. In this embodiment, package 100a includes a first fin seal 115a positioned proximal to the first side edge 118a, a second fin seal positioned proximal to the second side edge 118b, a third fin seal 115c positioned proximal to the third side edge 118c, and a fourth fin seal 115d positioned proximal to the fourth side edge 118d. In this embodiment, a peelable heat-seal seam 101a having an asymmetric cross-sectional seal interface 300 (illustrated in FIG. 3C below) is present within the first fin seal 115a. Heat-seal seam 101a may extend the entire length of the package or less than the entire length of the package.

Figure 2B:
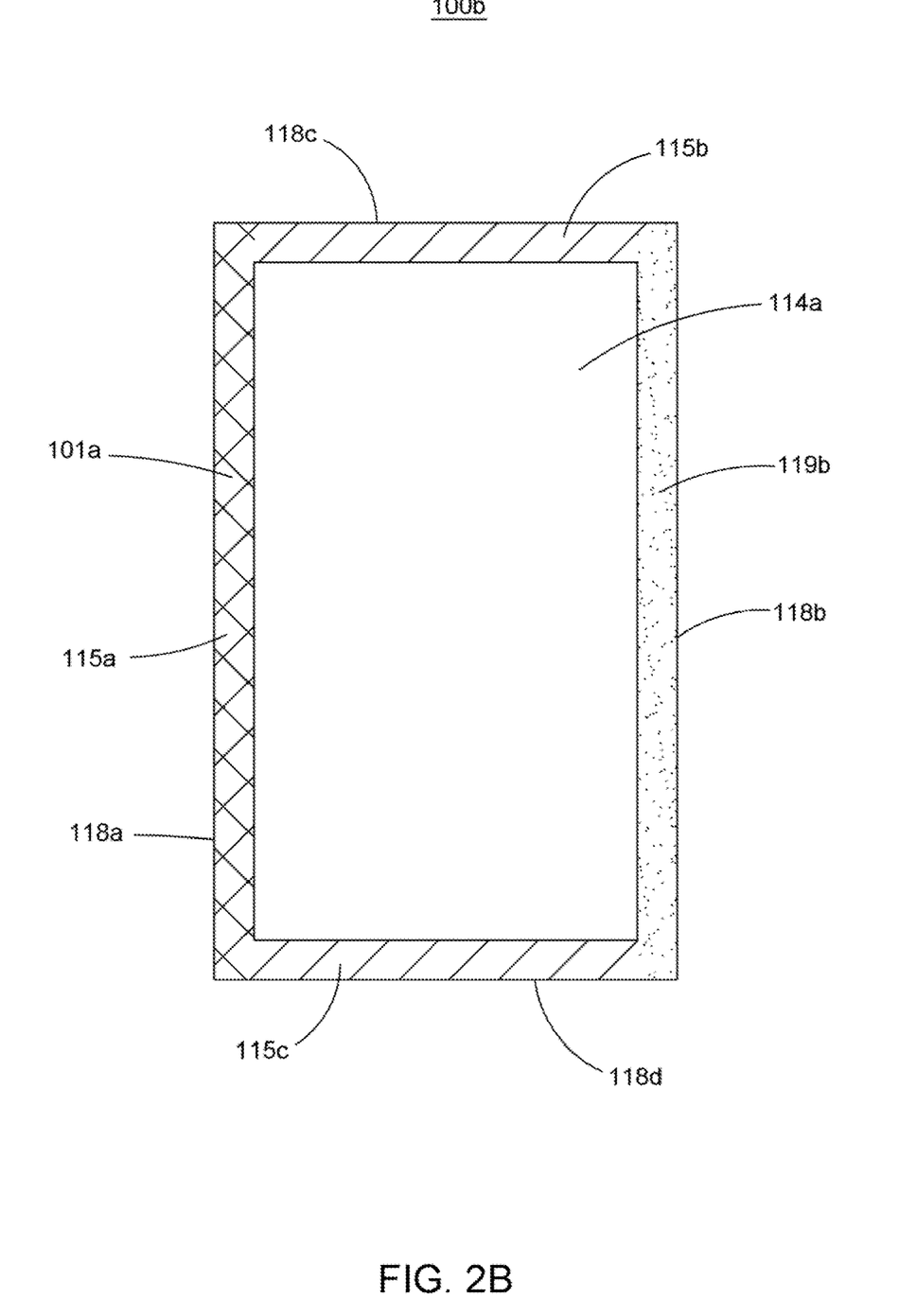
FIG. 2B illustrates a schematic view of another embodiment of a package according to the present invention.

FIG. 2B illustrates another preferred embodiment of the present invention. Package 100b is formed by folding laminate 10 upon itself connecting first laminate side 10a to second laminate side 10b by heat sealing sides 10a and 10b together to produce a first package wall 114a, an opposite second package wall 114b (not shown), a first fin seal 115a positioned proximal to a first side edge 118a, and a first folded edge 119a located at a second side edge 118b. In this preferred embodiment, package 100b also includes a second fin seal 115b positioned proximal to a third side edge 118c, and a third fin seal 115c positioned proximal to a fourth side edge 118d. As can be seen, first fin seal 115a is perpendicular to both second fin seal 115b and third fin seal 115c. In this embodiment, package 100a includes a peelable heat-seal seam 101b configured within first fin seal 115a of the package. As depicted, peelable heat-seal seam 101a extends substantially from the first package end 118a to the opposing second package end 118b and includes an asymmetric cross-sectional seal interface 300 illustrated in FIG. 3C below.

Figure 2C:
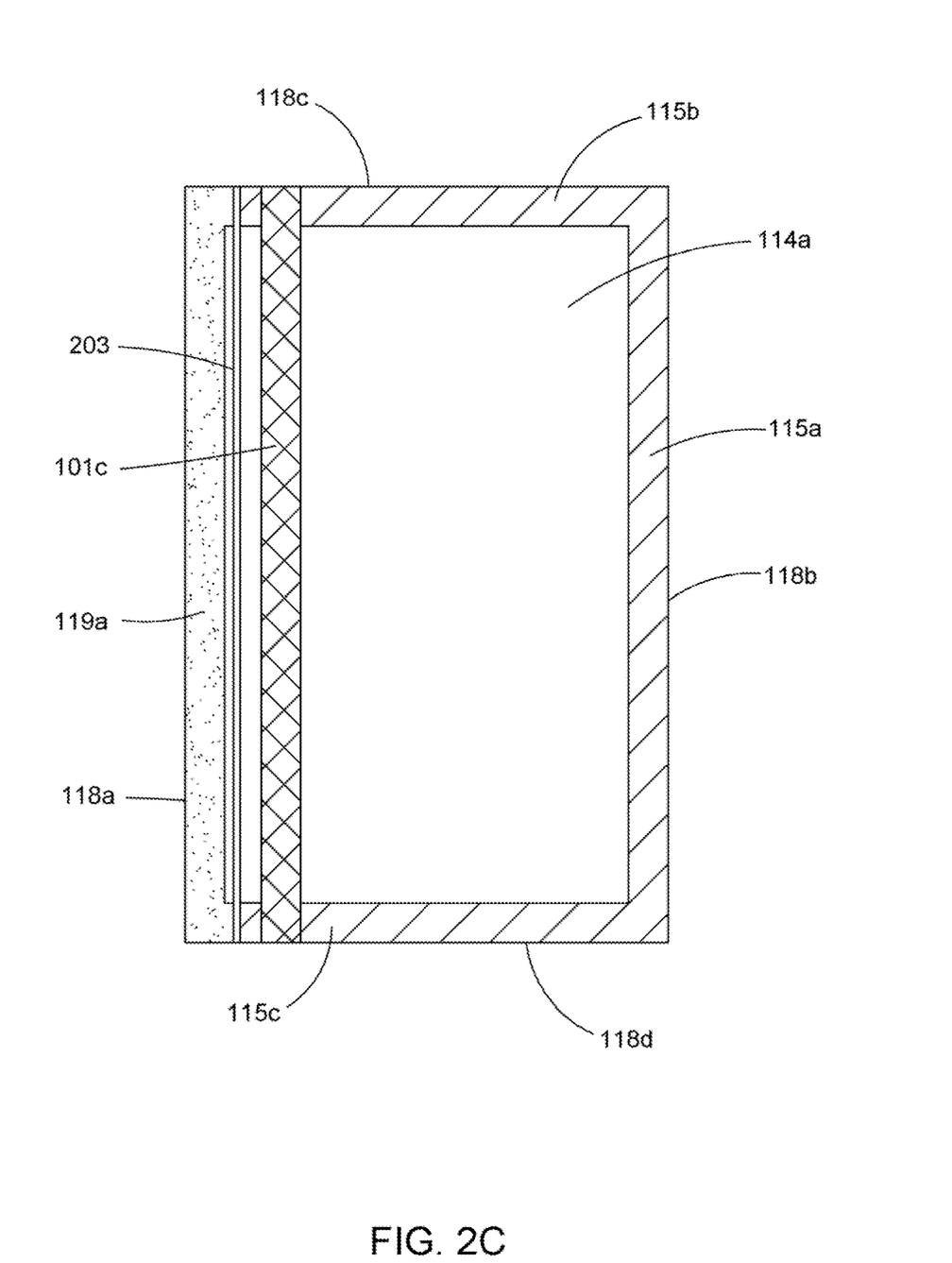
FIG. 2C illustrates a schematic view of another embodiment of a package according to the present invention.

Alternatively, the present invention can be illustrated in FIG. 2C made from laminate 10 of FIG. 1. As depicted, package 100c is shown in a laid flat condition and includes a first folded edge 119a located at a first side edge 118a, a first package wall 114a, an opposite second package wall 114b (not shown), a first fin seal 115a positioned proximal to a second side edge 118b, a second fin seal 115b seal positioned proximal to a third side edge 118c and a third fin seal 115c positioned proximal to a fourth side edge 118d. As can be seen, first fin seal 115a is configured perpendicular to both second fin seal 115b and third fin seal 115c. In this preferred embodiment, package 100c also includes a peelable heat-seal seam 101c having an asymmetric cross-sectional seal interface 300. As depicted, peelable seam 101c is not formed within a fin seal, but is disposed adjacent to the first fold 119a and may extend substantially from the third side end 118c to the opposing fourth package end 118d. Package 100c may optionally include a means to separate folded edge 119a. A means to separate a folded edge may comprise a score line 203 cut into laminate 10 or tear strip (not shown) extending substantially from the third side end 118c to opposing fourth side end 118d, and positioned between peelable heat-seal seam 101c and first folded edge 119a. The score line or tear strip may be used to aid in accessing peelable heat-seal seam 101c by separating the first package wall 114a from the second package wall 114b at first folded edge 119a. It should be apparent to those skilled in the art that once package walls 114a and 114b are separated, the consumer may then grasp each wall and manually pull apart peelable heat-seal seam 101c and thus open the package.

Figure 2D:
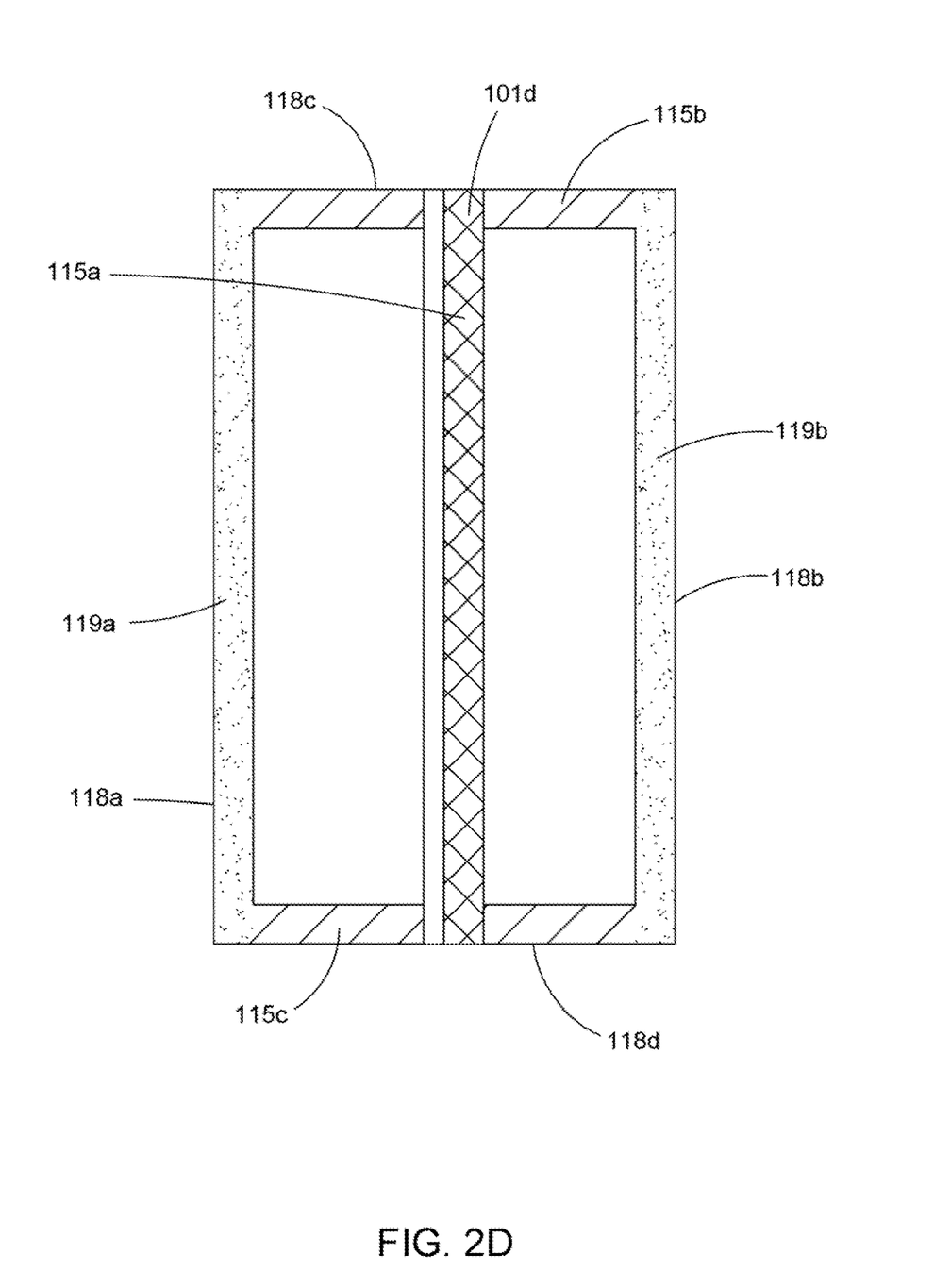
FIG. 2D illustrates a schematic view of another embodiment of a package according to the present invention.

Referring now to FIG. 2D, a preferred embodiment of the present invention is depicted generally as package 100d made from laminate 10 of FIG. 1. Package 100d includes a first fold edge 119a and a second fold edge 119b each located at first side edge 118a and opposing second side edge 118b, respectively. Positioned between first and second side edges 118a and 118b is a first fin seal 115a which extends substantially from third side edge 118c to fourth side edge 118d. Package 100d also includes a second fin seal 115b positioned proximal to third side edge 118c and a third fin seal 115c positioned proximal to fourth side edge 118d. As can be seen, first fin seal 115a is configured perpendicular to both second fin seal 115b and third fin seal 115c. Also included in package 100d is a peelable heat-seal seam 101d having an asymmetric cross-sectional seal interface 300 (illustrated in FIG. 3C below) formed within first fin seal 115a.

Figure 2E:
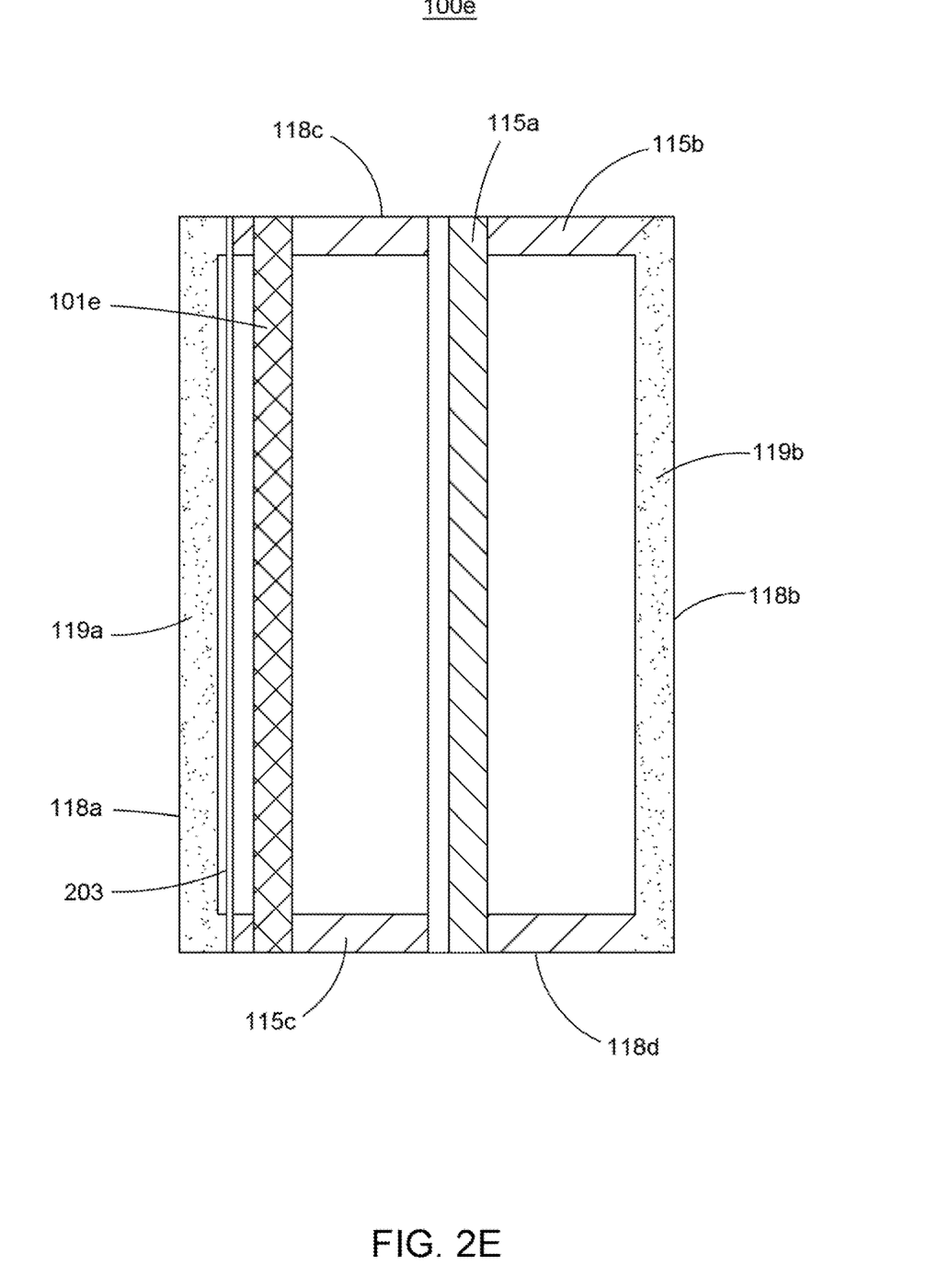
FIG. 2E illustrates a schematic view of another embodiment of a package according to the present invention.

Alternatively, the present invention can be illustrated in FIG. 2E made from laminate 10 of FIG. 1. As depicted, package 100e is shown in a laid flat condition with a peelable heat-seal seam 101e having an asymmetric cross-sectional seal interface 300 (shown below) which is not formed within a fin seal, but is disposed adjacent to first folded edge 119a and extends substantially from the third side end 118c to the opposing fourth side end 118d. As can be seen, package 100e includes a second folded edge 119b positioned opposite first folded edge 119a such that first fin seal 115a is positioned between first folded edge 119a and second folded edge 119b extending substantially from the first package end 118a to the opposing second package end 118b. Package 100e may optionally include a means to separate folded edge 119a. A means to separate a folded edge may comprise a score line 203 cut into laminate 10 or tear strip (not shown) extending substantially from the third side end 118c to opposing fourth side end 118d, and positioned between peelable heat-seal seam 101e and first folded edge 119a.

Figure 3A:
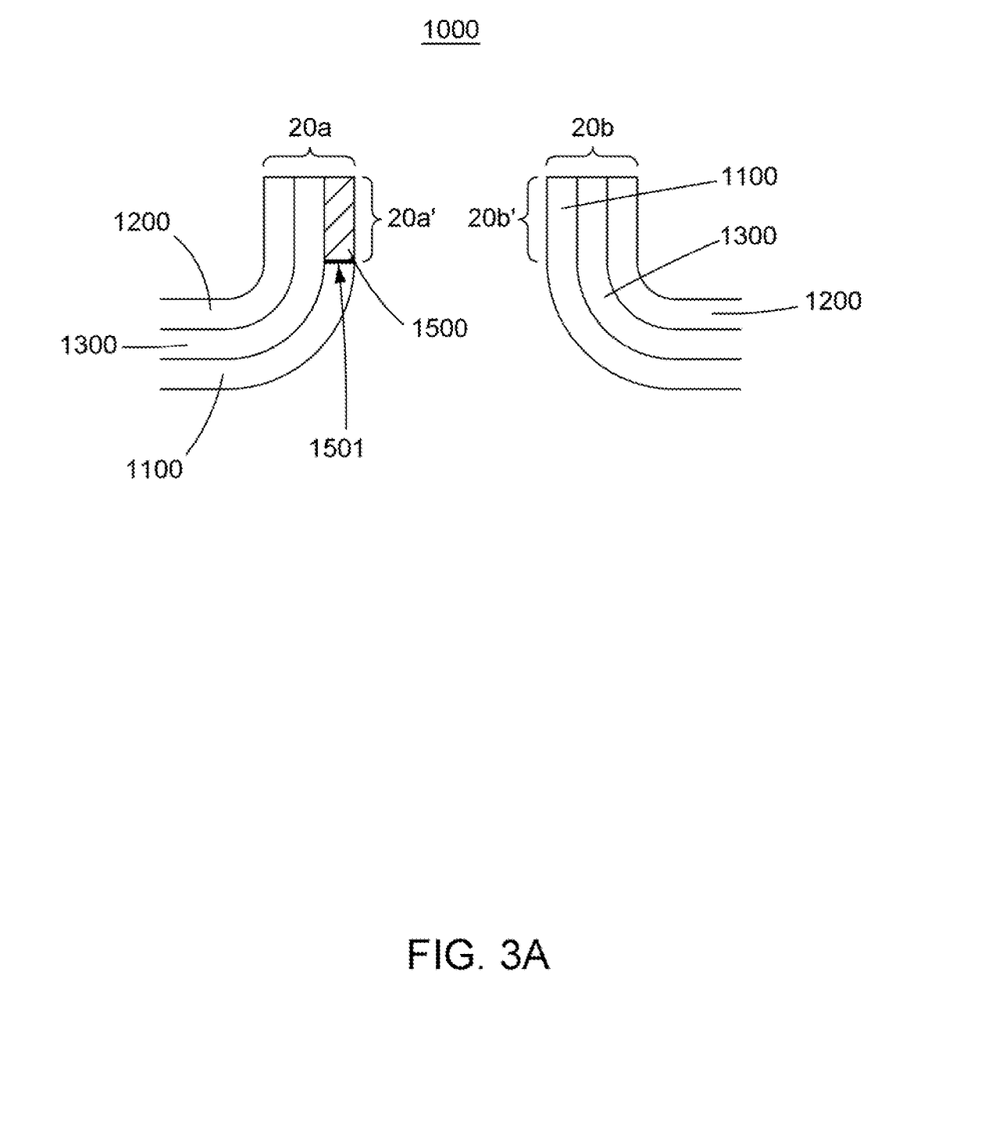
FIG. 3A illustrates a cross-sectional view of one embodiment of a peelable heat-seal seam prior to formation of an asymmetric cross-sectional seal interface of the present invention.
Figure 3B:
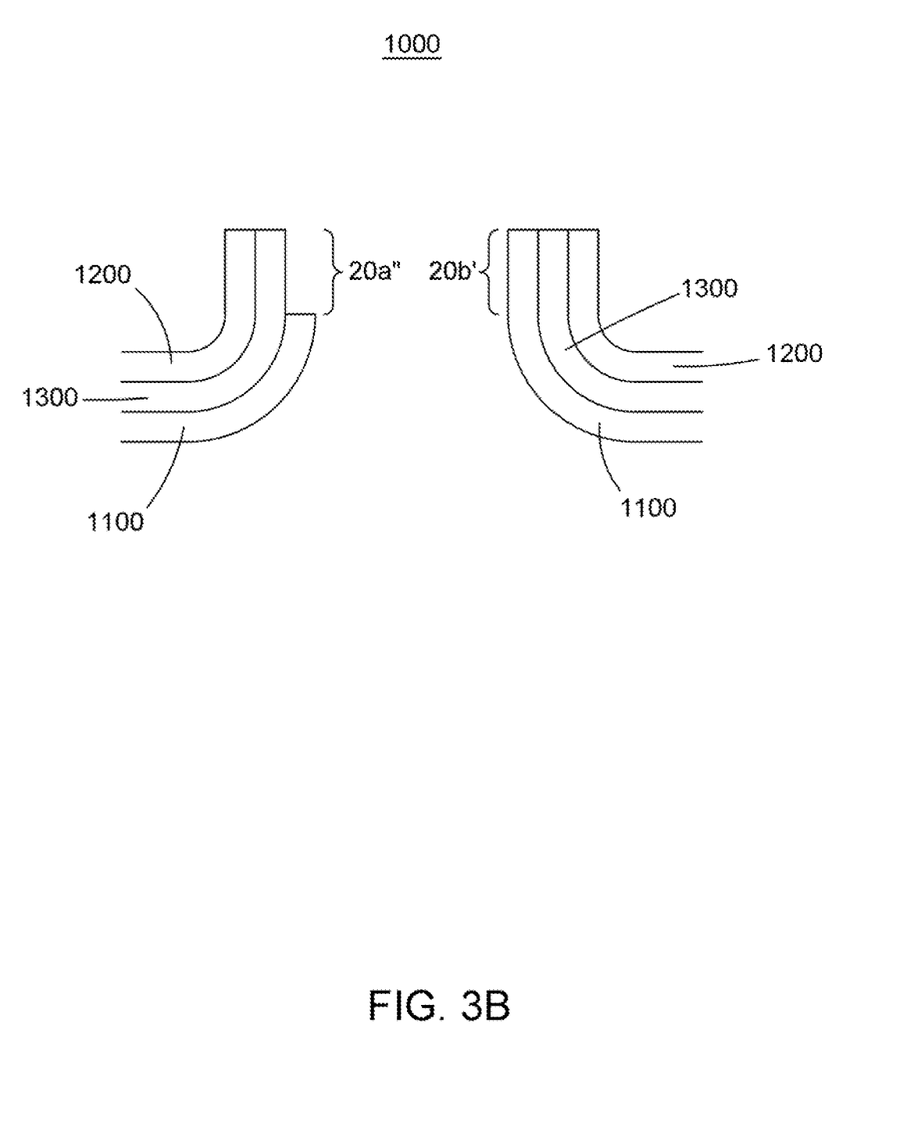
FIG. 3B illustrates a cross-sectional view of one embodiment of a peelable heat-seal seam during the formation of an asymmetric cross-sectional seal interface of the present invention.
Figure 3C:
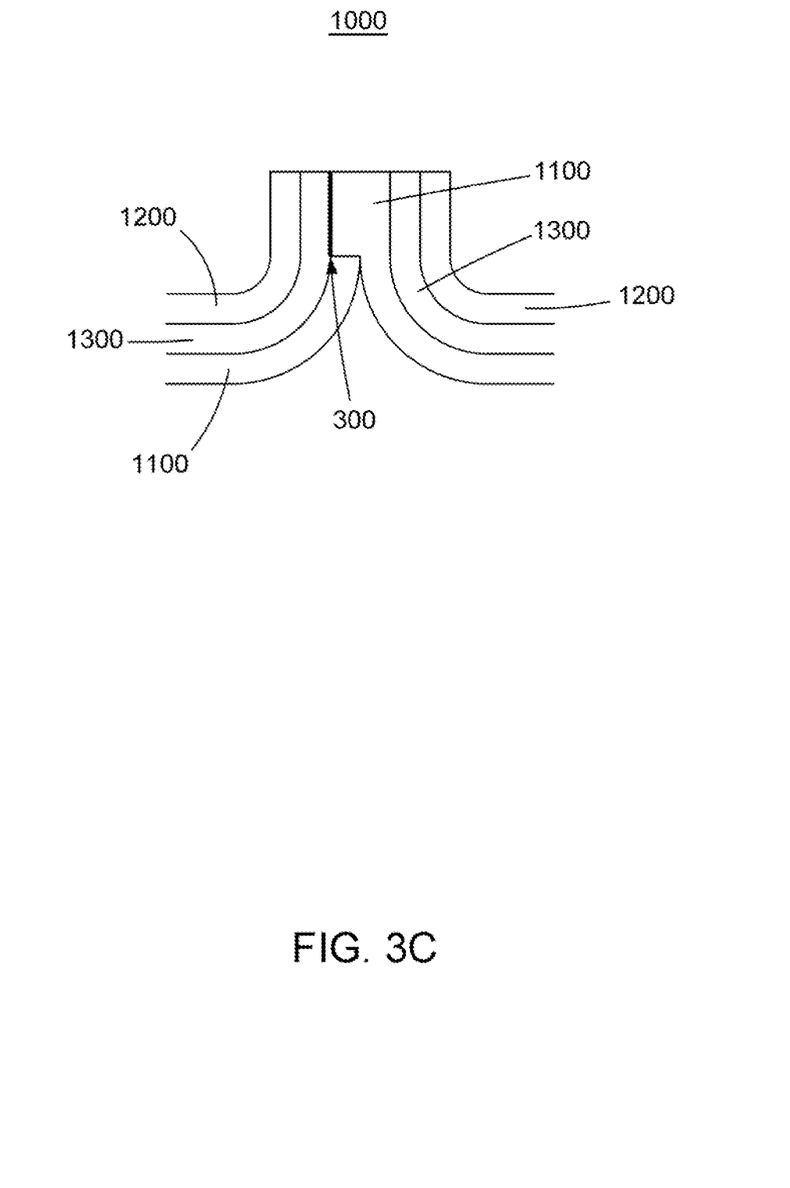
FIG. 3C illustrates a cross-sectional view of one embodiment of a peelable heat-seal seam having an asymmetric cross-sectional seal interface of the present invention.

FIGS. 3A, 3B and 3C illustrate the formation of one preferred embodiment of a peelable seam 1000 for use in with the present invention. Conventional fin seals will be constructed from two identical face-to-face sealing sections having identical film structures or laminate structures as shown in FIG. 3A. Conventional fin seals have a symmetrical cross-sectional sealing interface. In order to achieve an asymmetric cross-sectional sealing interface 300 of the present invention as shown in FIG. 3C, a single thermoplastic laminate 10 is divided into a first sealing section 20a having an interior surface 20a' and a second interior sealing film section 20b having an interior surface 20b'. A segment or strip of the first film 1500 is removed from first sealing section 20a before heat sealing it to the second sealing section 20b as depicted in FIG. 3B. When segment 1500 is removed, a new interior surface 20a" of sealing section 20a is created. There are at least two preferred methods of removing segment 1500 from sealing section 20a. The first preferred method may be used to create a peelable heat-seal seam within a fin seal such as those shown in FIGS. 2A, 2B and 2D. This first method includes forming a single score line or cut 1501 through the entire thickness of first film 1100 followed by extracting segment 1500 by vacuum immediately prior to laminating first film 1100 to second film 1200 directly or vis-à-vis lamination film 1300. The second method may be used to create a peelable heat-seal seam outside a fin seal such as those illustrated in FIGS. 2C and 2E. This second method includes forming at least two parallel score lines or cuts through the entire thickness of first film 1100 which are spaced apart from each other by a distance of between 0.125 in and 2.0 in (0.32 cm and 5.1 cm) followed by extracting segment 1500 by vacuum immediately prior to laminating first film 1100 to second film 1200. Those skilled in the art will recognize that forming score lines or cuts in thermoplastic materials is well known and may include either a mechanical technique such as a cutting roller or by optical methods using a laser ablation. Once segment 1500 has been removed from first sealing section 20a, the section will have a structure different than the second sealing section 20b. These sections are then heat sealed together to form an asymmetric cross-sectional sealing interface 300 as illustrated in FIG. 3C.

EXAMPLES

As used herein, the term "frangible layer" refers to one layer or more layers which exhibit adhesive failure, i.e., separation or delamination at an interface from an adjoining layer by application of a pulling or peeling force, or cohesive failure, i.e., separation within the frangible layer by application of a pulling or peeling force. "Peelable seal" and like terminology are used herein to refer to a seal, and especially heat seals, which are engineered to be readily peelable without uncontrolled or random tearing or rupturing the packaging materials which may result in premature destruction of the package and/or inadvertent contamination or spillage of the contents of the package. A peelable seam is one that can be manually peeled apart to open the package at the seal without resort to a knife or other implement to tear or rupture the package. The force required to affect adhesive or cohesive failure of a frangible layer may be measured by its "peel strength" in accordance with ASTM F-904 test methods. A frangible layer is adapted to remain secure and unbroken during package fabrication, distribution and storage, and yet may be relatively easily ruptured. Accordingly, the peel strength of a frangible layer is between 200 gram-force/inch (77.2 Newton/meter) and 3000 gram-force/inch (1157.6 Newton/meter) as measured in accordance with ASTM F-904 test method. The peelable fin seals of the present invention will have a peel strength of between 200 gram-force/inch (77.2 Newton/meter) and 3000 gram-force/inch (1157.6 Newton/meter) as measured in accordance with ASTM F-904 test method.

As used herein, the phrase "asymmetric cross-sectional sealing interface" refers to an "inside-inside" fusion bond or heat seal formed from a single multilayer laminate where there are two "different" structural film sections on either side of the bond interface. As used herein, the term "different" refers to a first structural film section which is not a mirror-image of a second structural film section bonded together at the sealing interface. For example, an asymmetric cross-sectional sealing interface may be represented by the following: A/B/C//B/C/A where "//" is the bond interface, A/B/C is a first structural film section having layer compositions A, B and C; and B/C/A is a second structural film section having the same layer compositions A, B and C as the first section, but are arranged in a different layer sequence. An asymmetric cross-sectional sealing interface may also be represented by the following: A/B/C/D//D/C where "//" is the bond interface, A/B/C/D is a first structural film section having layer compositions A, B, C and D; D/C is a second structural film section having an identical layer compositions C and D as the first section but omits layers A and B. An asymmetric cross-sectional sealing interface may still further be represented by the following: A/B/C/D//D/C/E where "//" is the bond interface. NB/C/D is a first structural film section having layer compositions A, B, C and D; D/C/E is a second structural film section having an identical layer compositions C and D, but omits layer A and B, and includes layer E which is not present in the first section.

Figure 4A:
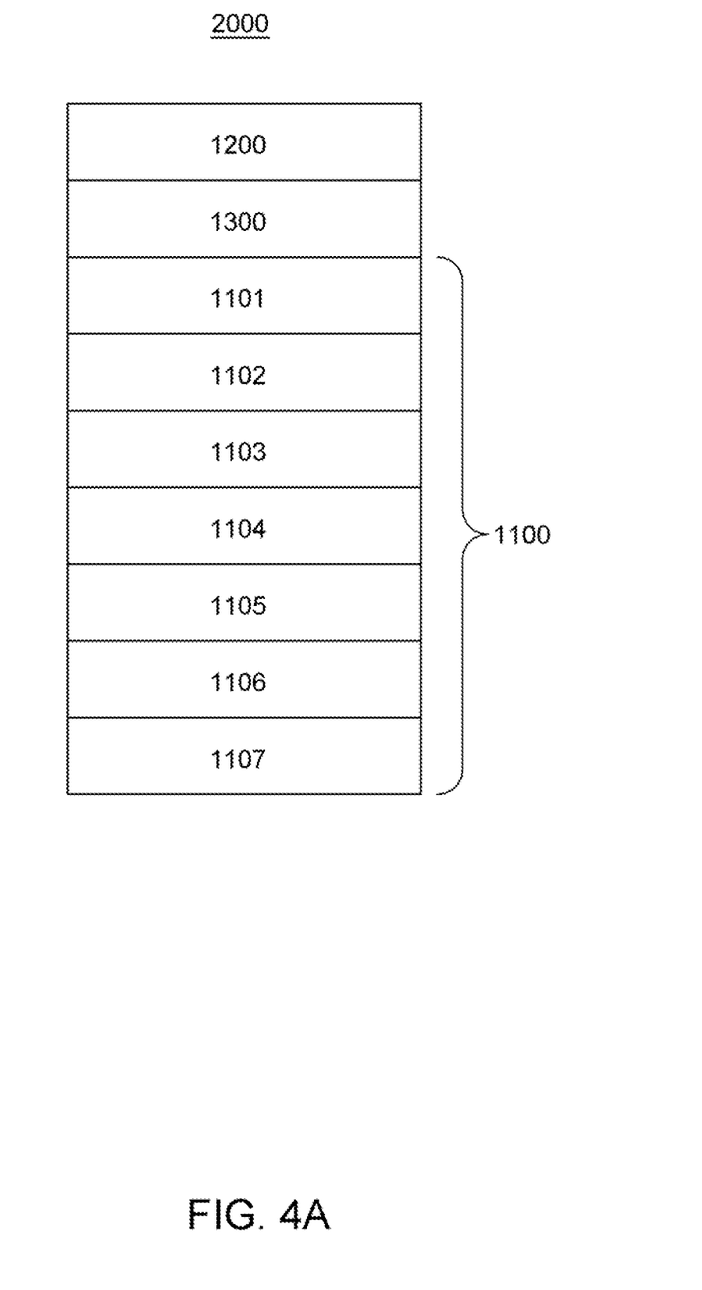
FIG. 4A illustrates a cross-sectional view of a preferred embodiment of a laminate of the present invention.

Referring now to FIG. 4A, there is illustrated one preferred embodiment of laminate 2000 comprising a first film 1100, a second film 1200 and a lamination film 1300. In this example, first film 1100 includes an exterior first layer 1101, an interior second layer 1102 positioned adjacent to the exterior sealant layer 1101, an interior third layer 1103 positioned adjacent to second layer 1102, an interior fourth layer 1104 positioned adjacent to the third layer 1103, an interior fifth layer 1105 positioned adjacent to the fourth layer 1104, an interior sixth layer 1106 positioned adjacent to the fifth layer 1105, and an exterior seventh layer 1107 positioned adjacent to the sixth layer 1106. While this example of first film 1100 is depicted as having seven layers, it should be understood that first film 1100 may be formed with less than seven or more than seven layers. In one preferred embodiment, the exterior first and seventh layers 1101 and 1107 may each comprise a heat sealable material. Heat sealable materials may include but are not limited to polyethylenes such as low density polyethylenes, very low density polyethylenes, ultra-low density polyethylenes, linear low density polyethylenes, ethylene α-olefin copolymers; ethylene vinyl acetate copolymers; ethylene methacrylate copolymers, ethylene acrylic acid copolymers, ionomers and blends thereof. In one preferred embodiment, the exterior seventh layer 1107 is a heat sealable layer comprising an ethylene vinyl acetate copolymer having a melt index of 20 g/10 min and more preferably, 30 g/10 min. Exterior seventh layer 1107 has a thickness of between 12.7 µm and 17.8 µm (0.5 mil and 0.7 mil).

The total thickness of first film 1100 of the present invention is generally from about 19.1 µm (0.75 mil) to about 254 µm (10 mil), most typically from about 31.7 µm (1.25 mil) to about 44.5 µm (1.75 mil).

In this particular example, second film 1200 is a monolayer film comprising an oriented material or paper. Oriented materials may include, but are not limited to oriented polyethylene terephthalates, oriented polypropylenes and oriented polyamides. In another embodiment, second film 1200 may include additional layers as desired. In a preferred embodiment, film 1200 is an oriented polyethylene terephthalate film having a total thickness of between 48 gauge and 142 gauge (12.2 µm and 36.1 µm).

This example also includes a lamination layer or film 1300. In one embodiment, lamination film 1300 includes at least one layer which is peelable or frangible which adheres the first film 1100 to the second film 1200. In one preferred embodiment, lamination film 1300 is a monolayer comprising a peelable or frangible blend of immiscible thermoplastic resins. In one preferred embodiment, the blend of immiscible thermoplastic resins may include but is not limited to a polybutene-1 (also referred to as polybutylene) resin and at least one resin selected from the group consisting of polyethylene, polypropylene, ethylene butene copolymer, ethylene vinyl acetate copolymer, propylene ethylene copolymer, ethylene acrylic acid copolymer, ethylene n-butyl acrylate, ethylene methyl acrylic acid copolymer, and ethylene methylacrylate copolymer. Peelable or frangible blends may include but are not limited to blends of between 5 wt. % and 30 wt. % of polybutene-1 and between 70 wt. % and 95 wt. % of at least one resin selected from the group consisting of polyethylene, polypropylene, ethylene butene copolymer, ethylene vinyl acetate copolymer, propylene ethylene copolymer, ethylene acrylic acid copolymer, ethylene n-butyl acrylate, ethylene methyl acrylic acid copolymer, and ethylene methylacrylate copolymer. In this embodiment, monolayer film 1300 is in direct contact with first film 1100 and second film 1200 and adheres first and second films together In another preferred embodiment, lamination film 1300 includes two layers: a peelable or frangible first layer and a second layer. In this embodiment, the second layer comprises a thermoplastic resin which is heat sealable to first film 1100 and is positioned between the peelable or frangible layer and first film 1100. It is also contemplated that second layer is designed to rupture along with peelable or frangible first layer when the peelable seam 1000 is pulled apart to open the package. Materials suitable for use in heat sealing first film 1100 and second layer together may include but are not limited to low density polyethylenes, very low density polyethylenes, ultra-low density polyethylenes, linear low density polyethylenes, ethylene α-olefin copolymers; ethylene vinyl acetate copolymers; ethylene methacrylate copolymers, and blends thereof. In yet another embodiment, lamination film 1300 includes a peelable or frangible layer, a first heat sealable layer and a second heat sealable layer where the peelable or frangible layer is positioned between first and second heat sealable layers. In this embodiment, the first heat sealable layer is in direct contact with first film 1100 and the second heat-sealable layer is in direct contact with second film 1200. In this third embodiment, the first and second heat sealable layers may comprise the same heat sealable materials or different heat sealable materials depending upon the composition of films 1100 and 1200. The total thickness of lamination film 1300 is generally from between about 2.54 μm and 25.4 μm (0.1 mil and 1.0 mil) and typically from between 7.62 μm and 19.1 μm (0.3 mil and 0.75 mil).

Working Example

In the following example, the film structure for first film 1100 was produced using a blown film co-extrusion apparatuses, and methods which are well known to those skilled in the art. The blown film co-extrusion film apparatus includes a multi-manifold flat die head for film through which the film composition is forced and formed into a flat sheet. The sheet is immediately quenched e.g., via cooled water bath, solid surface and/or air, and then formed into a film.

In the production of Example 1 as illustrated in FIG. 4A, laminate 2000 may be produced by fabricating first film 1100 using blown film co-extrusion methods. Prior to lamination first film 1100 to second film 1200, a segment of first film 1100 can be removed by scoring into film 1100 and extracting the segment 1500 by vacuum. Then, second film 1200 can be laminated to the exterior layer 1101 of first film 1100 by lamination film 1300 using extrusion lamination equipment and methods well known to those skilled in the art.

Example 1

Example 1 is one embodiment of laminate 2000 of the present invention having a structure and layer compositions as described below and as illustrated in FIG. 4A, Reported below is the layer composition relative to the total weight of the layer.

Layer 1200: 100 wt.-% of a 142 gauge biaxially oriented polyethylene terephthalate film (OPET)-Jindal J-201 OPET (Jindal Poly Films Ltd., New Delhi, INDIA).

Layer 1300: 82 wt.-% of an ethylene vinyl acetate copolymer (EVA)-Petrothene® NA442051 (Equistar Chemicals, LP. Houston, Tex., USA) and 18 wt.-% of a polybutene-1 (PB)-PB 8640M (Equistar Chemicals, LP, Houston, Tex., USA).

Layer 1101: 92.2 wt.-% of a ultra-low density polyethylene (ULDPE)-ATTANE® 4701G (Dow Chemical Corporation, Midland, Mich., USA) and 7.8 wt.-% of a polyethylene masterbatch containing processing additives, Layer 1102: 93.6 wt.-% of a ultra-low density polyethylene (ULDPE)-ATTANE® 4701G (Dow Chemical Corporation, Midland, Mich., USA) and 6.4 wt.-% of an anhydride modified linear low density polyethylene-TYMAX® GT4300 (Westlake Chemical, Houston, Tex., USA).

Layer 1103: 100 wt.-% of a nylon 6/66-BASF Ultramid® C33 01 (BASF Polyamides and Intermediates, Freeport, Tex., USA).

Layer 1104: 100 wt.-% of an ethylene vinyl alcohol copolymer (EVOH)-SOARNOL® ET 3803 (Soarus L.L.C., Arlington Heights, Ill., USA).

Layer 1105: 100 wt.-% of a nylon 6/66-BASF Ultramid® C33 01 (BASF Polyamides and Intermediates, Freeport, Tex., USA).

Layer 1106: 87.1 wt.-% of an ethylene vinyl acetate copolymer (EVA)-DuPont™Elvax® 3165 (E. I. du Pont de Nemours and Company, Wilmington, Del., USA) and 12.9. wt.-% of an anhydride modified linear low density polyethylene-TYMAX® GT4300 (Westlake Chemical, Houston, Tex., USA).

Layer 1107: 76.6 wt-% of an ethylene vinyl acetate copolymer (EVA)-DuPont™Elvax® 3176 (E. I. du Pont de Nemours and Company, Wilmington, Del., USA) and 23.4 wt.-% of an ethylene vinyl acetate copolymer masterbatch containing processing additives.

Figure 4B:
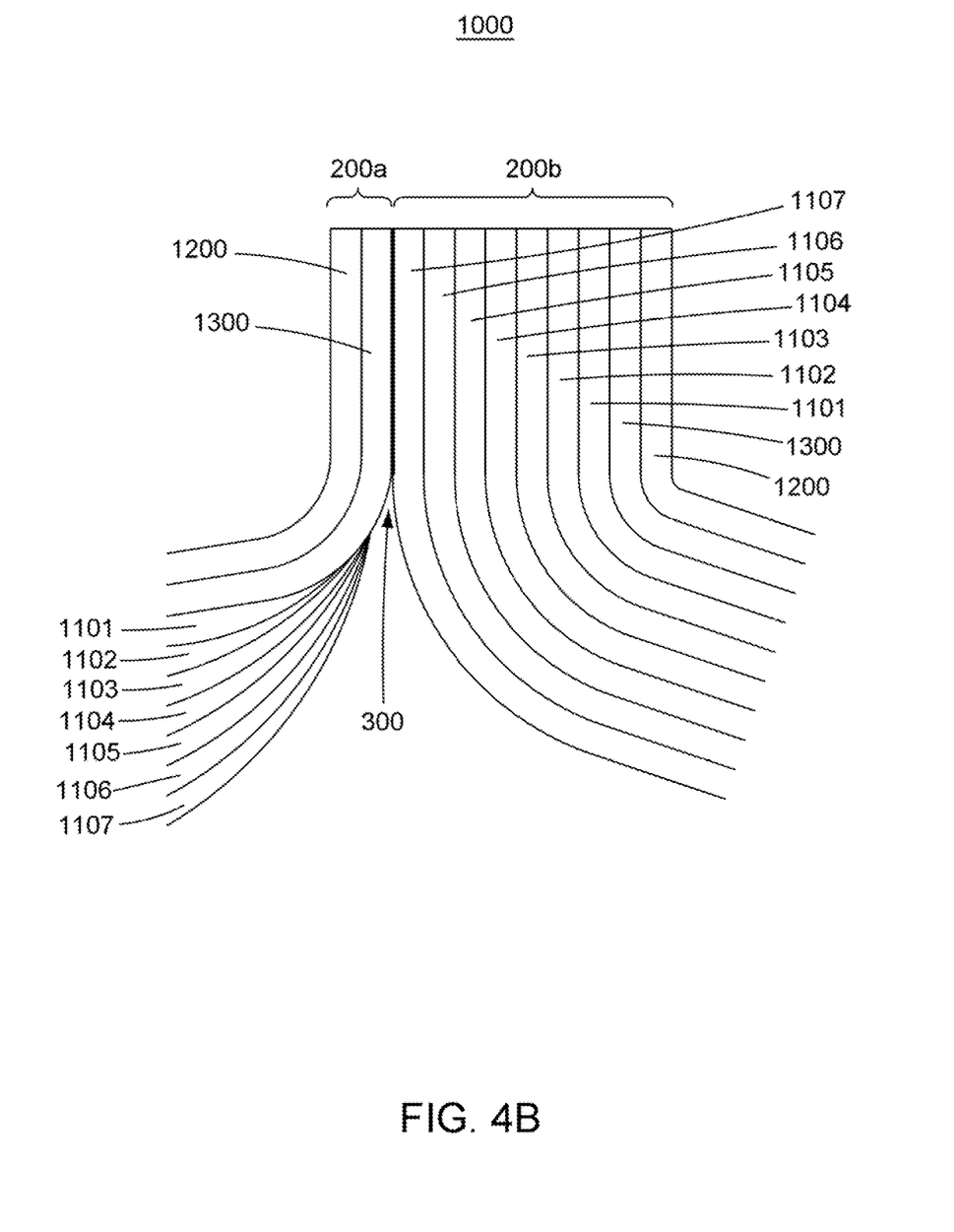
FIG. 4B illustrates a cross-sectional view of a preferred embodiment of a peelable heat-seal seam having an asymmetric cross-sectional seal interface formed from a preferred embodiment of the laminate described in FIG. 4A.

Turning now to FIG. 4B, there is illustrated a cross-sectional view of a preferred embodiment of a peelable, resealable heat-seal seam 1000 having an asymmetric cross-sectional seal interface 300 formed from a preferred embodiment of laminate 2000 as described above in FIG. 4A. In this embodiment, a segment of first film 1200 (layers 1101 to 1107) has been removed from the laminate 2000 to create a first sealing section 200a composed of only lamination layer 1300 and second film 1200 on one side of interface 300. As depicted, first sealing section 200a has been heat sealed to a second sealing section 200b corresponding to an unaltered portion of laminate 2000 composed of first film 1100, lamination film 1300 and second film 1200 on the opposite side of interface 300. Since a segment of first film has been removed leaving only one frangible layer 1300 present within the peelable, resealable heat-seal seam 1000, when the asymmetric interface 300 is pulled apart the package can be opened.

The above description and examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

What is claimed:

1. A peel-open, non-reclosable package formed from a single thermoplastic laminate comprising a first film, a second film and a lamination film or lamination layer, wherein the laminate comprises a first sealing section having an interior surface, and a second sealing section having an interior surface; the package comprising:
    a first side edge;
    an opposing second side edge;
    a third side edge;
    an opposing fourth side edge;
    a peelable heat-seal seam adhering the interior surface of the first sealing section to the interior surface of the second sealing section; and
    an asymmetric cross-sectional seal interface within the peelable heat-seal seam formed by disjoining a segment of the first film from the first sealing section prior to heat sealing the first and second sealing sections together, wherein the asymmetric cross-sectional seal interface comprises two different films of the first film, the second film and the lamination film or lamination layer on either side of the asymmetric cross-sectional seal interface.

2. The package according to claim 1, wherein the lamination layer or lamination film adheres the first film to the second film.

3. The package according to claim 1, wherein the first film is a coextruded multilayered non-oriented film.

4. The package according to claim 1, wherein the second film is an oriented film.

5. The package according to claim 1, wherein the package comprises a first fin seal positioned proximal to the first side edge and the peelable heat-seal seam is formed within the first fin seal.

6. The package according to claim 5, wherein the package comprises a first fold located at the second side edge.

7. The package according to claim 6, wherein the package comprises a second fin seal positioned at the third side edge and a third fin seal positioned proximal to the opposing fourth side edge.

8. The package according to claim 1, wherein the package comprises a first fold located at the first side edge, a first fin seal positioned proximal to the second side edge, a second fin seal positioned proximal to the third side edge and a third fin seal positioned proximal to the fourth side edge; wherein the peelable heat-seal seam is disposed adjacent to the first fold.

9. The package according to claim 8, wherein the package comprises a score line in the laminate or tear strip each positioned between the first fold and the peelable heat-seal seam.

10. The package according to claim 1, wherein the package comprises a first fold located at the first side edge, a second fold located at the second side edge, a first fin seal positioned between the first side edge and the second side edge, a second fin seal positioned proximal the third side edge, a third fin seal positioned proximal to the fourth side edge, wherein the peelable heat-seal seam is formed within the first fin seal.

11. The package according to claim 1, wherein the package comprises a first fold located at the first side edge, a second fold located at the second side edge, a first fin seal positioned between the first side edge and the second side edge, a second fin seal positioned proximal the third side edge, a third fin seal positioned proximal to the fourth side edge, wherein the peelable heat-seal seam is disposed adjacent to the first fold.

12. The package according to claim 11, wherein the package comprises a score line in the laminate or tear strip each positioned between the first fold and the peelable heat-seal seam.

13. The package according to claim 1, wherein the lamination film or lamination layer comprises a peelable or frangible blend of immiscible thermoplastic resins.

14. The package according to claim 13, wherein the lamination film comprises a first layer comprising the peelable or frangible blend of immiscible thermoplastic resins and a second layer comprising a heat sealable resin which is positioned between the first layer and the first film.

15. The package according to claim 14, wherein the lamination film comprises a third layer comprising a heat sealable resin which is positioned between the first layer and the second film.

16. The package according to claim 13, where the blend comprises a polybutene-1 resin and at least one resin selected from the group consisting of polyethylene, polypropylene, ethylene butene copolymer, ethylene vinyl acetate copolymer, propylene ethylene copolymer, ethylene acrylic acid copolymer, ethylene n-butyl acrylate, ethylene methyl acrylic acid copolymer, and ethylene methylacrylate copolymer.

17. The package according to claim 1, wherein the interior surface of the first sealing section is the lamination film or lamination layer.

18. The package according to claim 1, wherein the interior surface of the second sealing section is an exterior layer of the first film.

19. The package according to claim 18, wherein the exterior layer comprises an ethylene vinyl acetate copolymer having a melt index of at least 20 g/10 min.

20. The package according to claim 18, wherein the exterior layer has a thickness of between 12.7 µm and 17.8 µm (0.5 mil and 0.7 mil).

21. The package according to claim 1, wherein the second film comprises an exterior layer of a material selected from the group consisting of oriented polyethylene terephthalate, oriented polypropylene, oriented polyamide and paper.

22. The package according to claim 21, where the exterior layer of the second film is an exterior package surface.

23. The package according to claim 1, where the package is either a vertical flow-wrap package or a horizontal flow-wrap package.

* * * * *